(12) United States Patent
Gutman

(10) Patent No.: US 10,762,004 B2
(45) Date of Patent: Sep. 1, 2020

(54) HARDWARE INDEPENDENT PERIPHERAL CONTROL SYSTEM AND METHOD

(71) Applicant: Densitron Technologies Ltd., Kent (GB)

(72) Inventor: Matej Gutman, Ljubljana (SI)

(73) Assignee: DENSITRON TECHNOLOGIES LIMITED, Cambridgeshire (GB)

(*) Notice: Subject to any disclaimer, the term of this patent is extended or adjusted under 35 U.S.C. 154(b) by 0 days.

(21) Appl. No.: 16/180,531

(22) Filed: Nov. 5, 2018

(65) Prior Publication Data

US 2019/0138460 A1    May 9, 2019

(30) Foreign Application Priority Data

Nov. 3, 2017   (GB) .................................. 1718259.3

(51) Int. Cl.
*G06F 13/10*    (2006.01)
*G06F 13/38*    (2006.01)
(Continued)

(52) U.S. Cl.
CPC .......... *G06F 13/102* (2013.01); *G06F 9/4411* (2013.01); *G06F 9/45558* (2013.01);
(Continued)

(58) Field of Classification Search
None
See application file for complete search history.

(56) References Cited

U.S. PATENT DOCUMENTS

| | | |
|---|---|---|
| 6,044,428 A | 3/2000 | Rayabhari |
| 6,233,640 B1 | 5/2001 | Luke et al. |

(Continued)

FOREIGN PATENT DOCUMENTS

| | | |
|---|---|---|
| CN | 101581964 A | 11/2009 |
| CN | 104950839 A | 9/2015 |

OTHER PUBLICATIONS

GB Search Report in co-pending, related GB Application No. 1718259.3.

*Primary Examiner* — Idriss N Alrobaye
*Assistant Examiner* — Dayton Lewis-Taylor
(74) *Attorney, Agent, or Firm* — Thomas | Horstemeyer, LLP

(57) ABSTRACT

A hardware independent peripheral control system and method are disclosed. The system comprises:
a virtualised controller (20) executable by a processor (35) of a host system (30). The virtualised controller (20), when executed by the host system (30), has an input interface (21), an output interface (22), a processor (23) and a memory (24). The memory (24) encodes data on one or more peripheral specific instructions to control a peripheral (40) attached or connected to the host system (30). The input interface (21) is configured to receive peripheral agnostic instructions from the host system (30). Upon receiving the peripheral agnostic instructions at the input interface (21), the processor (23) of the virtualised controller (20) is configured to generate corresponding peripheral specific instructions in dependence on the data in the memory (24) and output the corresponding peripheral specific instructions via the output interface (22) to the peripheral (40) via a physical connection between the host system (30) and a peripheral (40).

15 Claims, 3 Drawing Sheets

(51) Int. Cl.
*G06F 13/40* (2006.01)
*G06F 13/42* (2006.01)
*G06F 9/455* (2018.01)
*G06F 9/4401* (2018.01)

(52) U.S. Cl.
CPC ........ *G06F 13/385* (2013.01); *G06F 13/4018* (2013.01); *G06F 13/426* (2013.01); *G06F 2009/45579* (2013.01)

(56) References Cited

U.S. PATENT DOCUMENTS

| | | |
|---|---|---|
| 6,952,831 B1 | 10/2005 | Moore |
| 2006/0085627 A1* | 4/2006 | Noorbakhsh .......... G09G 5/363 713/1 |
| 2016/0371201 A1 | 12/2016 | Crews et al. |

* cited by examiner

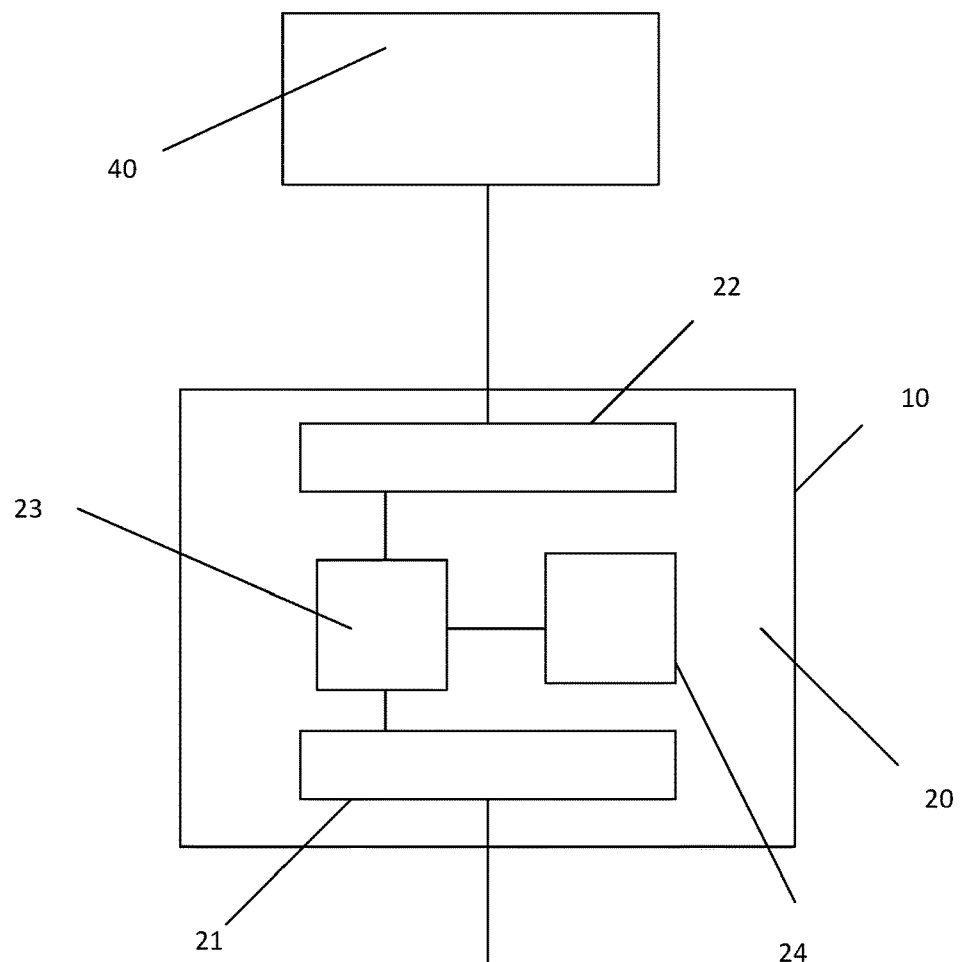
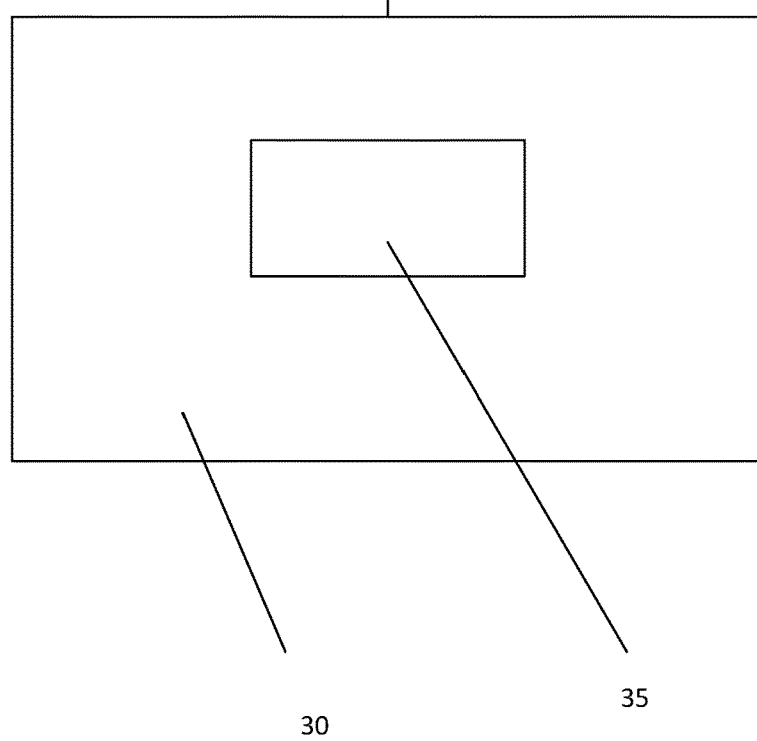
Fig. 1

HARDWARE INDEPENDENT PERIPHERAL CONTROL SYSTEM AND METHOD

CROSS-REFERENCE TO RELATED APPLICATION

This application claims priority to GB Patent Application No. 1718259.3 filed Nov. 3, 2017, the contents of which are incorporated by reference in its entirety as if set forth herein.

FIELD OF THE INVENTION

The present invention relates to a hardware independent peripheral control system and method that is particularly applicable to control of display devices.

BACKGROUND TO THE INVENTION

In computer systems, there is typically some delineation between hardware units. Generally, there is some form of central processing unit and one or more connected peripherals. The central processing unit is often a general purpose computer such as a PC or server but it may be an application specific computing device such as a system on a chip (SOC). Peripherals are generally separate to the central processing unit (in some cases they may share a common power supply and in others they may have their own power supply) and are typically interchangeable. Peripherals may include input devices (such as user input devices, sensors, data network interfaces etc.) and output devices (such as display devices, printers, data storage devices etc.). Often, peripherals may have both input and output functions—for example a touchscreen display enables both input and output, likewise a storage device or network interface may be a source of input data or a destination for outputting data.

The delineation of units is intended to enable flexibility—the user or system implementer is not restricted by the hardware unit combination the manufacturer wishes to offer and can pick and choose the units, often from different manufacturers.

In order to support such flexibility, standards have arisen over time that dictate how units connect and communicate. Standards are often based around specific communication bus types, for example all USB compatible units must have appropriate USB connection ports and must be able to communicate over those ports using specific communication protocols.

Although peripherals are often physically remote from the central processing unit and connected by cables, for the purposes of this application this need not be the case and they may be directly connectable, for example by plugging into a hardware bus port on a motherboard etc. of the central processing unit.

Each hardware unit will generally require some form of initialization on start-up. This will vary depending on factors including the complexity of the device and also the functions it supports. A display, for example, will require less initialization than a touchscreen which has not only to deal with initialization of its display functionality but also that of its touch panel.

In order to maintain flexibility, it is common for the various peripheral units and their manufacturers to be responsible for their own initialization and provision of support for communication over the respective bus. How this is achieved varies a great deal and can depend on the approach favored by the manufacturer, the intended market and/or the system or operating system architecture used.

Peripheral manufacturers are typically different to those manufacturing the central processing unit and its operating system. This means they may have to provider drivers or similar applications for execution by the central processing unit and its operating system to enable it to interact with the peripheral. Many peripheral manufacturers prefer to retain control and minimize developing drivers and the like. Their peripherals may include initialization routines in firmware in the unit Others, particularly those handling low cost and/or mass production peripherals may make them so generic that they can rely on routines are included as standard within the operating system, BIOS or firmware of the central processing unit.

One area where there is a great variance is in embedded display devices, that is, those designed as a component to be embedded within larger systems. While display devices typically provide the same basic functions, how they are initialized and driven varies. In some cases, the bus types supported dictate at least some of this (displays supporting HDMI or DisplayPort busses, for example, are likely to relatively consistent due to the prescribing nature of the respective standards). However, standardization and interchangeability is rarer in embedded display devices as an element of engineering is expected (and accepted) as part of constructing the larger system, incorporating driving routines for the embedded display device in the programming/firmware of the larger system so it can use the embedded display device. Embedded display systems vary widely in size, application and features. For example, a display in a mobile phone, ATM, vehicle entertainment system and video billboard would all typically fall under the definition of "embedded".

In general, a display device typically has one or more controllers and/or driver circuits for proper control of the display device. Driver circuits, such as those used to drive a panel such as an LCD, for example, may be bonded directly to, and situated along the edge of the display panel itself. Alternatively, driver circuits may be mounted within the display device. In either case, the driver circuits are typically located at the display panel side of the interface with the computer system.

In order to initialize a display device, information on register settings is typically needed (most of which depend on physical properties of the panel used in the display device) as well as the display device manufacturer's prescribed power-up sequence (apply voltage, reset IC, hold reset, wait x amount of microseconds, release reset, etc.). In end-user display devices such as PC monitors, for example, these settings and steps are typically handled by routines encoded within the display device itself.

In end-user display devices such as PC monitors, mechanisms such as EDID, and its proposed successor DisplayID, may be provided by the electronics of the display device. These mechanisms use a ROM or PROM in the display to store a machine-readable description of the panel's capabilities. Once the display has been initialized, the EDID data can be obtained by the graphics system in the processing unit/computer system. EDID data typically includes manufacturer name and serial number, product type, phosphor or filter type, timings supported by the display, display size, luminance data and pixel mapping data. However, EDID is typically only available for recent end user display devices and is only available after initialization and so the panel initialization information still needs to come from somewhere. In the case of embedded display systems, EDID is typically seen as an unnecessary luxury—the embedded display device isn't going to be changed for another so the added expense and hardware overhead of providing such functionality is not incurred.

As can be seen from the above explanation, display information (via EDID or similar) and device-based initialization are provided in end-user display devices addressed by way of extra components in the display device.

However, extra components equate to extra costs and resources to house and implement them in the display device. In embedded display devices, these overheads are generally undesirable. Often, a display panel will be selected for use with as few supporting systems or circuits as possible to save on space and cost. Some commercial display panels use a driver integrated circuit (IC) that is a generic TFT panel driver such that the same driver IC may be used for different panel types. To keep the costs low, some of these ICs are based on SRAM technology.

Where the IC is generic, the register settings (refresh direction, analog voltages settings, gamma curves, etc.) have to be loaded at every power up. Hence, these kinds of panel need initialization after every power-up.

This is taken into account during implementation of the central processing unit and its systems—which are generally bespoke for the application in question. For example, a public announcement display may have specific a panel or panels that are driven by a bespoke central processing unit (or units) in which the panel's initialization code can be incorporated when the public announcement system is being developed. To minimize resource usage and costs further, many such systems are moving from general purpose PCs as central processing units to application specific system on a chip (SOC).

STATEMENT OF INVENTION

According to an aspect of the present invention, there is provided a hardware independent peripheral control system comprising: a virtualized controller executable by a processor of a host system, the virtualized controller, when executed by the host system, having an input interface, an output interface, a processor and a memory, the memory encoding data on one or more peripheral specific instructions to control a peripheral attached to the host system, the input interface being configured to receive peripheral agnostic instructions from the host system, wherein upon receiving the peripheral agnostic instructions at the input interface, the processor of the virtualized controller is configured to generate corresponding peripheral specific instructions in dependence on the data in the memory and output the corresponding peripheral specific instructions via the output interface to the peripheral via a physical connection between the host system and a peripheral.

The physical connection could, for example, be SPI, I2C, UART, or similar.

Existing peripheral control systems suffer various disadvantages. In the case of end-user devices, the additional hardware and routines on the peripheral device add to cost and also must be engineered for each peripheral variant. For example, different display devices will need different EDID settings, they may need different initialization routines etc.

In the case of implementations seeking to minimize in-peripheral components such as embedded systems, the overhead is shifted to the manufacturer/system implementer to provide via the central processing unit. Where peripherals such as display devices are not uniform or one is replaced by a different model, problems and additional complication and expense can arise. Additionally, changing from one central processing unit type or architecture to another will require re-engineering of the support routines.

Preferred embodiments are particularly suited for use with display devices and particularly embedded display devices. Embodiments advantageously enable technologies such as touch-screen and haptic systems to be flexibly accommodated. In embodiments of the present invention, peripheral control such as initialization and control routines are handled within a virtual machine environment so that they can be ported from one system/architecture to another with limited re-engineering. Overhead and resources are avoided in both the peripheral and the host system. The virtual environment can support multiple different devices (such as displays of different models, sizes, feature sets etc.) as well as different device types or device types of multiple functions (a touch screen display for example requires both display and touch control functionality).

Further, embodiments of the present invention seek to enable a degree of plug and play in embedded systems without the resource overhead associated with EDID etc. Even if EDID or similar was implemented for an embedded display, the initialization routines hard coded in the larger system for driving the display would need to change upon replacement of the display with a different one. Adding a brand new display without recompiling part of source code is impossible in that case. In contrast, substitution of one display with another or a non-haptic display with one that provides haptic feedback in embodiments of the present invention requires no new hardware in the peripheral (the haptic display) or the host (the system in which the haptic display is being embedded). Instead, control is handled by the virtual machine which runs on the host system and acts as an intermediary between the host and the peripheral. Preferably, the virtual machine and/or its supported devices is extensible to support new devices, device types etc. Typically, the virtual machine would only change if it is used on another host system that has different physical connections.

In the case of the virtual machine being ported to a different architecture (such as a host processor supporting the x86 instruction set to one supporting ARM, for example), then the layer/unit of the virtual machine that acts as an I/O wrapper would be recompiled for execution on the different instruction set. Preferably, this layer/unit implements transformation of the virtual machine's I/O calls to a host's actual native I/O interfaces. The reminder of the virtual machine is preferably an abstract architecture implementation that does not change when changing architecture. Preferably, this is the portion that deals with control and translation of peripheral agnostic instructions into peripheral specific instructions which it then passes to the layer that translates the I/O calls to the host's actual native I/O interfaces.

Embodiments of the present invention seek to address the above described issues. In preferred embodiments, a portable control system is provided as a virtual machine (it is portable in the sense that the control system is defined for execution in a virtual run-time environment and is not tied to a specific architecture). The control system acts as an intermediary layer between a host and a peripheral such as a display system. The host can issue device-agnostic commands (such as abstract commands that do not need to specify parameters of the display device) and the control system translates these from data stored in its memory before communicating display device specific commands to the display device over a communication channel (which channel may itself be prescribed in the data stored in the memory of the virtual controller). In this way, functionality, necessary initialization instructions and parameters of the display system can be defined and maintained in the virtual control system, drivers and ICs at the host and display system can be kept to a minimum and the maintenance overhead involved in swapping display devices or porting to a different host architecture is minimized.

Embodiments of the present invention seek to enable flexibility in embedded displays without adding substantially to cost and resource overhead. Using an embodiment of the present invention, a display does not need to be 'fixed' in terms of being unchangeable over product lifetime and production run. Using an embodiment of the present invention, an embedded display can be changed in less time and requires less resources/resource changes to do so.

Furthermore, embodiments of the present invention seek to provide mechanisms and systems in which an embedded device such as a display can be substituted with another of different features, type or attributes without any recompiling of the system in which the device is embedded.

In selected embodiments, the virtual machine may relay device-specific calls via the host system, for example accepting a peripheral agnostic command and returning peripheral specific commands and an identifier of the host's I/O interface to be used to communicate the peripheral specific commands. In other embodiments, this may be transparent to the host system with the virtual machine routing the commands directly to the relevant host's I/O interface.

Embodiments of the present invention provide an architecture independent communication entity. Preferred embodiments are directed to an virtual control system that is responsible for startup and initialization of a peripheral. Optionally, control may be passed to an operating system or firmware for communication after startup and initialization.

Where embodiments of the present invention concern only startup and initialization, flexibility is preferably selected over speed such maximum numbers of peripherals may be controlled using a simple generic command language. This approach is selected because in the case of system startup, most of our communication is done only once.

Embodiments of the present invention executes instructions at Virtual Machine level—not on the hardware level of the host or peripheral itself. Hardware is used just to store virtual machine image (e.g. EEPROM, SD card, . . . ).

In embodiments of the present invention, the communication protocol is implemented in virtual machine. No logic is programmed into the host or peripheral adapter board itself.

Preferably, the virtual machine is communications oriented. Usually, virtual machines define CPU, registers, memory space, etc. In preferred embodiments of the present invention, this is unimportant and either handled by the host system or at a level that is transparent and inaccessible to developers working with the virtual machine. As a result, the virtual machine itself is very small, compact and easily updateable as it focuses on dealing with communication channels.

BRIEF DESCRIPTION OF THE DRAWINGS

Embodiments of the present invention will now be described by way of example only with reference to the accompanying drawings in which:

FIG. 1 is a schematic diagram of a hardware independent peripheral control system;

DETAILED DESCRIPTION

Figure 2:
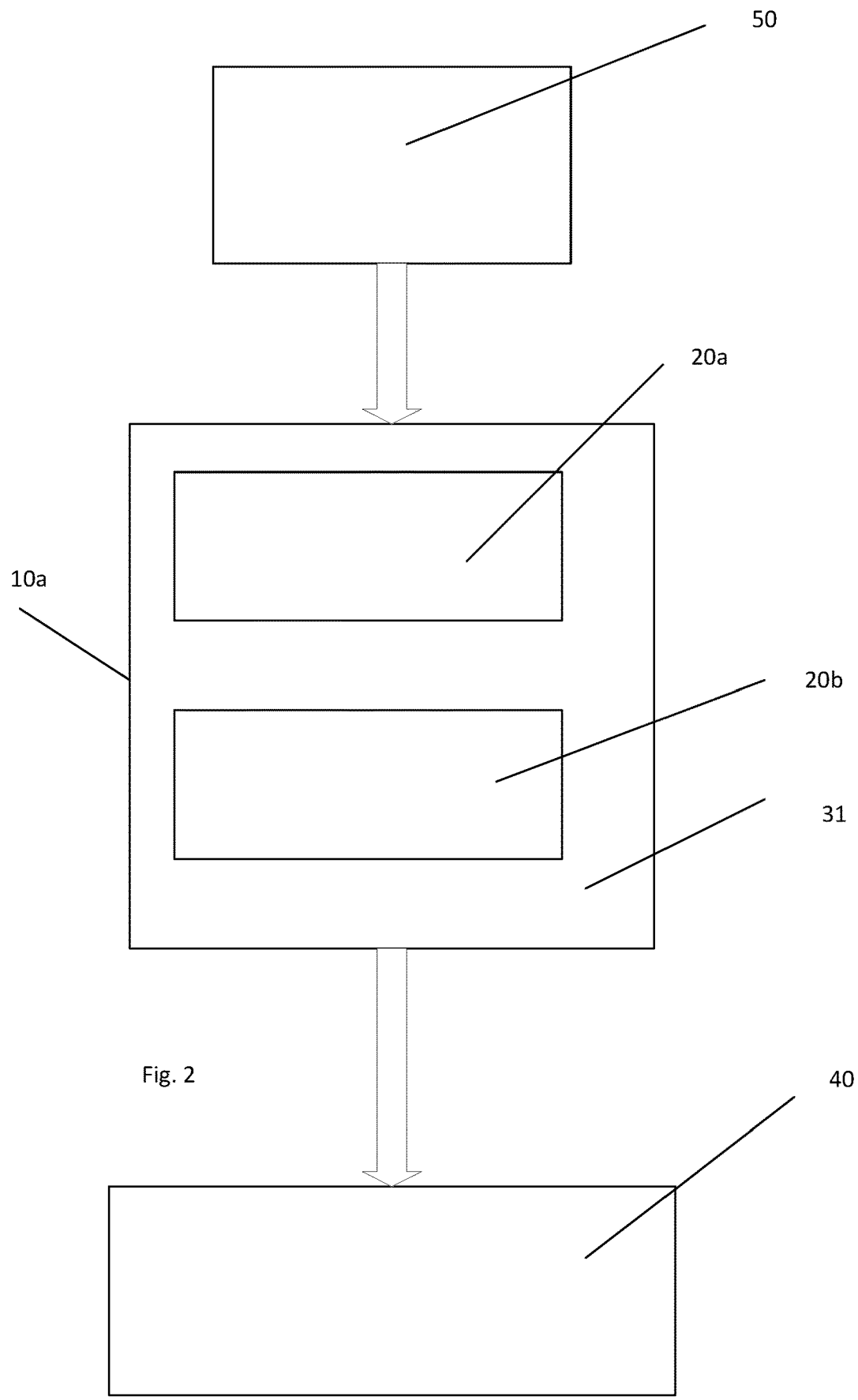
FIG. 2 is a schematic diagram illustrating selected implementation aspects of the virtualized controller in more detail; and, FIG. 3 is a schematic diagram illustrating selected aspects of the virtualized controller acting as a display system controller.

FIG. 1 is a schematic diagram of a hardware independent peripheral control system 10. The system 10 includes a virtualized controller 20 that is executable by a processor 35 of a host system 30. When the virtualized controller 20 is executed by the processor 35 of the host system 30, it provides an input interface 21, an output interface 22, a communications processor 23 and a memory 24.

Although the input interface 21, output interface 22, communications processor 23 and memory 24 are all virtualized entities, the virtualization is transparent to the host system 30.

The memory 24 stores data on one or more peripheral-specific instructions that can be used to control a peripheral 40 attached/connected to the host system, examples of which are discussed in greater detail below. The input interface 21 is configured to receive peripheral agnostic instructions from the host system 30. Upon receiving the peripheral agnostic instruction(s) at the input interface 21, the processor 23 of the virtualized controller 20 is configured to generate corresponding peripheral specific instructions in dependence on the data in the memory 24 and output the corresponding peripheral specific instructions via the output interface 22 to the peripheral 40 via a physical connection (communication channel) 21 between the host system 30 and the peripheral 40. The term "physical connection" is intended to mean a connection that is ultimately non-virtual and could encompass wireless as well as wired connections.

Preferably, the virtualized controller is communications-oriented. As explained above, the virtualized controller 20 generates peripheral specific instructions that correspond to those received at the input interface 21. The virtualized controller preferably also handles initialization and error reporting—if a command is received that is to be written to a UART, for example, the virtualized controller 20 handles this and provides a positive return code if successful and an appropriate return code if the action is unsuccessful or not possible. Commands received at the input interface are preferably to be written in a generic assembler-like language, although they do not need to be atomic and a command may trigger multiple activities by the virtualized controller 20. Preferably, the commands used to the input interface 21 are common to all supported peripherals (or at least all supported peripherals of a particular type—it may be that different hardware independent peripheral control systems 10 are used for different peripheral types/functions as a hardware independent peripheral control system 10 for handling communications via network interfaces over a wired or wireless network would potentially need a different command set to one handling display devices).

While the communications processor 23 may execute operations other than pure communications operations, these preferably are limited to peripheral support operations. Preferably, the virtual run-time environment 31 is dedicated to providing a portable environment in which hardware independent input receives commands from a common command set that do not differ irrespective of the host system 30 or peripheral, the virtual run-time environment 31 transparently handling generation of corresponding peripheral specific instructions and communication of these to the peripheral via the relevant output interface 22.

FIG. 2 is a schematic diagram illustrating selected aspects of the virtualized controller 20 in more detail.

Preferably, the host system 30 runs a virtual run-time environment 31. The virtual run-time environment may, in this embodiment, be provided so as to run on a bare metal system, within a Uboot environment, on a hypervisor, on an operating system or in some other environment. The virtualized controller 20, in this embodiment, is provided to the host system 30 as a binary on a carrier medium 50 such as an EEPROM, SD card, flash memory, SATA disk, USB storage device etc.) that the virtualized run-time environment 31 executes (under the control of the host's processor 35) to create the virtualized controller 20.

By providing the virtualized controller 20 in this way, the controller itself can be written in a manner that is portable between different chipsets/processor instruction set architectures. The virtual run-time environment deals with chipset/processor instruction set issues that are unique to that host system and provides an abstract layer at which the virtualized controller 20 operates.

It will be appreciated that the virtual machine architecture described is particularly small and requires limited resource overhead. It nevertheless provides substantial flexibility to system implementers as to devices that can be used (or embedded in the case of an embedded system) without prescribing specific hardware or functionality of the peripheral—indeed this opens up the possibility of supporting any existing peripheral (with or without features such as EDID support) and embodiments are also preferably extensible to support new peripherals that become known after deploying the virtualized controller.

The only reason modification to the virtualized controller may be needed is if there are differences in the output interface(s) to the peripheral supported by the host system that do not map or require particular instructions from the output interface 22 of the virtualized controller 20. To address this, the source code or binary may divided or made modular with an API between them. For example in the illustrated example core functionality is provided by the virtual machine layer 20a and an interfaces layer 20b. The virtual machine 10a provides the majority of the functionality of the virtualized controller 20 and does not change between chipsets, architectures etc. (because any chipset or architecture supporting the virtual run-time environment will support the virtualized controller as it is written for and at the level of abstraction provided by the virtual run-time environment). The interfaces layer 20b can be varied to accommodate issues such as those described above without the remainder of the virtualized controller needing to be re-written.

It will be appreciated that multiple different peripherals 40 or peripheral types may be controlled by the virtualized controller 20. It will furthermore be appreciated that the virtualized controller 20 may be provided with functionality to support multiple different peripherals of the same or different types.

The virtualized controller may be extensible so that the range of peripherals, peripheral types or indeed operations supported for specific peripherals may be extended or changed over time. Preferably, this is achieved by replacing the virtualized controller itself with a more recent image. However, alternatively or additionally, this may be via a software update to the virtualized controller (for example it may update from a local file or data source on the host system 30 or from a remote file or data source over a data communication network).

It will also be appreciated that the physical connection (the communication channel between the host and peripheral) could be wired, wireless etc. and may be addressed directly by the output interface 22 or via an interface or other components of the host system 30. In the case of display systems discussed below, the physical connection may be SPI, I2C, USB or another configuration channel that is available at the host system for communicating with displays or other devices. Once initialized, a driver (or embedded system) may then communicate with the peripheral over a communication channel which may be the same or different (for example RGB, MIPI, LVDS etc. for a display device). Preferably, the virtual machine provides the display driver information on what interface is to used for embedded display and what are the properties. Where it is needed in advance of this for initialization, the virtual machine is invoked and it abstracts configuration channel (SPI for example) so that the host system can trigger initialization etc. in a peripheral and hardware agnostic manner.

In the case of touchscreen, the touchscreen related functions may use a different connection (such as SPI, USB, I2C) to the display.

The virtual run-time environment 31 may be provided as a separate component to the virtualized controller 20. Both may be provided as compiled binaries and configured to inter-communicate during execution. Optionally, the virtualized controller 20 may be interpreted or otherwise executed by the virtual run-time environment.

Alternatively, the virtual run-time environment 31 and virtualized controller 20 may be provided and executed as a single component.

Figure 3:
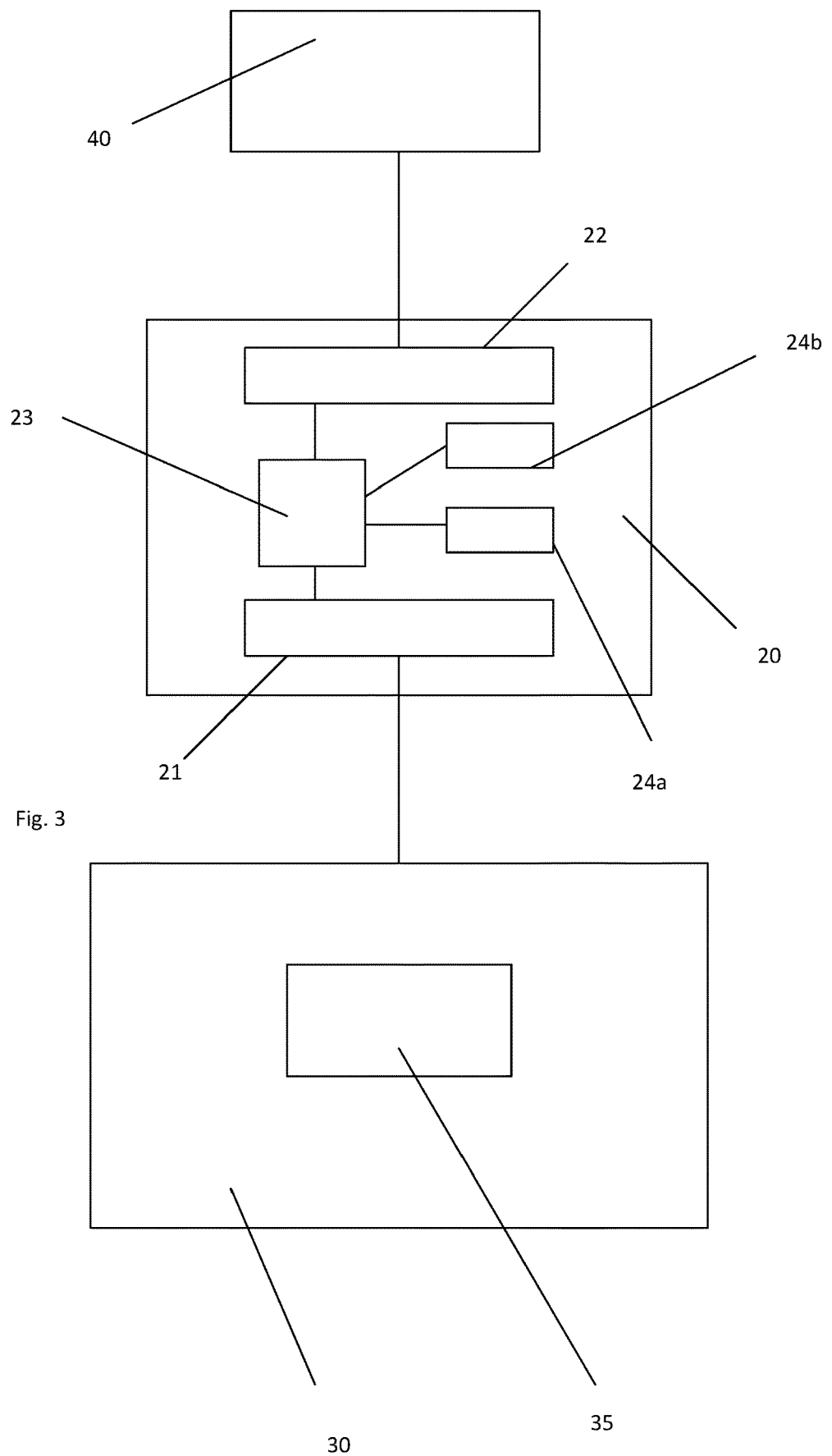

FIG. 3 is a schematic diagram illustrating selected aspects of the virtualized controller acting as a display system controller.

Preferably, the virtualized controller 20 provides a control environment for display systems and includes functionality and routines accessible by the host system 30 for initializing and subsequently interacting with the display system. The display system may be a touch-screen display system and/or a haptic system, the virtualized controller 20 providing a control environment for both the display system and the touch-screen or haptic system as needed. These systems can be supported as a collective unit (so the virtualized controller treats the display/touch-screen/haptic system as a single addressable system and sends them collective initialization commands etc.) or they may be supported as individual elements that are addressed separately. How the virtualized controller deals with peripherals does not need to be a concern to those interacting with the virtualized controller—they issue the peripheral agnostic commands and relaying these to the peripheral is handled transparently by the virtualized controller.

The data in the memory 24 preferably includes a data repository 24a storing data on specific parameters and functions of display systems. Examples of such data include:

| | |
|---|---|
| ID | Identifier for display system |
| NAME | Panel name |
| REFRESH | Refresh rate in Hz |
| TFT_XRES | X resolution of the panel |
| TFT_YRES | Y resolution of the panel |
| PIXCLOCK | Pixel clock - in picoseconds |
| LEFT_MARGIN | Left margin |

| | |
|---|---|
| RIGHT_MARGIN | Right margin |
| UPPER_MARGIN | Upper margin |
| LOWER_MARGIN | Lower margin |
| HSYNC_LEN | Hsync length |
| VSNC_LEN | Vsync length |
| SYNC_MODES | Sync signal modes. Bits description:<br>* bit 7-3: Reserved<br>* bit 2: HSYNC polarity.<br>0 = falling edge<br>1 = rising edge<br>* bit 1: VSYNC polarity.<br>0 = falling edge<br>1 = rising edge<br>* bit 0: DOTCLOCK polarity.<br>0 = falling edge<br>1 = rising edge |
| ORIENTATION | Orientation byte. Values:<br>0 = Portrait orientation<br>1 = Landscape orientation |
| BIT_PACK | Packing of bits. Possible values:<br>* 0: 24-bit 8:8:8 RGB<br>* 1: 24-bit 8:8:8 BGR<br>* 2: 18-bit 6:6:6 RGB<br>* 3: 18-bit 6:6:6 BGR<br>* 4: 16-bit 5:6:5 RGB<br>* 5: 16-bit 5:6:5 BGR<br>* Other: Reserved. |
| FB_SIZE | Size of framebuffer needed for one frame (in Bytes). |
| IF_TYPE | Interface type. Possible values:<br>* 0: RGB parallel interface<br>* 1: LVDS interface |
| TFT_FW_START | TFT firmware start pointer. If 0x00000000, there is no firmware. |
| RESERVED | Reserved. Reads 0xFF or firmware content. |
| PB_CHKSUM | Panel block checksum. Simple byte sum is used (including reserved area: 1020B). |

In the case of a touch-screen display, the data may include:

| | |
|---|---|
| TOUCH_PRESENT | Presence of touch panel. Possible values:<br>* 0 = No TP<br>* 1 = TP present |
| TP_XRES | X resolution of the touch panel |
| TP_YRES | Y resolution of the touch panel |
| CHIPSET_NAME | Zero terminated string (chipset name) |
| INTERFACE_TYPE | Interface type. Possible values:<br>* 0: Analog (ADC)<br>* 1: I2C interface<br>* 2: USB interface<br>* 3: SPI interface |
| TP_FW_START | TP firmware start pointer. If 0x00000000, there is no firmware. |
| RESERVED | Reserved. Reads 0xFF or firmware content. |
| TPB_CHKSUM | Touch panel block checksum. Simple byte sum is used (including reserved area: 1020B). |

In one embodiment, the binary executed by the virtual machine is encoded on an EEPROM that is at or accessible to the host system. In one embodiment, on boot-up of the host system, the host system's I2C bus is probed for EEPROM. If an EEPROM is found, a predetermined ID (DID) string is read from the EEPROM and a checksum is preferably calculated to ensure integrity of the virtual machine.

Data needed by a display driver (Xres, Yres, margins, pixel clock, interface type, . . . ) is then loaded and a virtual machine binary start pointer is read (TFT_FW_START). If the pointer is not 0x00000000, then the virtual machine is invoked. If it is 0x00000000, there is no binary needed for that particular display and the virtual machine is not loaded. A further check of the binary may then be made (for example of the header and checksum) before the virtual machine starts executing (example operations during execution are described below).

When the virtual machine (VM) finishes, it may provide return values such as:
VM return: If 0, VM finished execution successfully with RETURN statement. Anything else than 0, describes run-time error (non-existing interface, unknown op code, etc.)
Binary return: If VM executed successfully (returned 0), this is the return code that is passed by program itself. Usually 0 means success, anything else means error (example: 1=failed to read display controller ID register, 2=failed to read touch ID, . . . ). This return value is passed on by program as RETURN statement followed by value.

In operation, commands are received from the host system 30 via the input interface 21. An example is set out below with comments explaining the effect of the agnostic commands in italics: IFACE SPI 0
This will instruct VM to open SPI port 0. Any subsequent reads/writes will be directed to SPI 0. The virtualized controller will try to open SPI port. If it fails to do so, it will raise an error in run-time.

An example of writing to I/O channel after previous command:
WRITE INT16_T INT9_T 0x01 0x55
This will instruct the virtualized controller to try to write via SPI 0:
16 bit address (INT16_T) is set to 0x01
9 bit data (INT9_T) is set to 0x55
Below is an example of the virtualized controller trying to put RESET line to logic state '1', wait 100 us, put the line to '0', wait another 300 us and put the line back to '1':
RESET 1
DELAYUS 100
RESET 0
DELAYUS 300
RESET 1

Commands may be as low level or high level as desired. For example, the above commands are closer in nature to assembler type commands but it will be appreciated that support could be provided for a series of such commands to be triggered with a higher level command. Upon receiving a command to initialize a display system, for example, processor 23 of the virtualized controller 20 identifies the display system connected to the host 30 and retrieves the data stored in the data repository 24a for the respective display system. It then retrieves initialization routine from a routine repository 24b and uses the retrieved data and initialization routine to create display specific instructions that are communicated over the interface designed in the data from the data repository (SPI, I2C, USB etc.) to the display system 40 to set up the driver IC.

The host system can then can start using the display system 40 by providing video data to the display system 40. This may be via the virtualized controller or the host may communicate directly with the peripheral at that point. Optionally, the virtualized controller may provide EDID type data back to the host system so that even if the display itself did not supply EDID type data, the virtualized controller can provide it on its behalf.

Optionally, the routines in the routine repository 24b may be written in an environment specific language (for example something similar to assembler) and translated within the controller to device specific commands.

It is to be appreciated that certain embodiments of the invention as discussed above may be incorporated as code (e.g., a software algorithm or program) residing in firmware and/or on computer useable medium having control logic for enabling execution on a computer system having a computer processor. Such a computer system typically includes memory storage configured to provide output from execution of the code which configures a processor in accordance with the execution. The code can be arranged as firmware or software, and can be organized as a set of modules such as discrete code modules, function calls, procedure calls or objects in an object-oriented programming environment. If implemented using modules, the code can comprise a single module or a plurality of modules that operate in cooperation with one another.

Optional embodiments of the invention can be understood as including the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

Although illustrated embodiments of the present invention have been described, it should be understood that various changes, substitutions, and alterations can be made by one of ordinary skill in the art.

The invention claimed is:

1. A hardware independent peripheral control system comprising:
    a virtualized controller executable by a processor of a host system, the virtualized controller, when executed by the host system, having an input interface, an output interface, a processor and a non-transitory memory, the non-transitory memory encoding data on one or more peripheral specific instructions to control a peripheral attached to the host system, the input interface being configured to receive peripheral agnostic instructions from the host system, wherein upon receiving the peripheral agnostic instructions at the input interface, the processor of the virtualized controller is configured to generate corresponding peripheral specific instructions in dependence on the data in the non-transitory memory and output the corresponding peripheral specific instructions via the output interface to the peripheral via a physical connection between the host system and a peripheral,
    wherein the virtualized controller comprises a plurality of layers including an input/output wrapper layer, wherein only the input/output wrapper layer is dependent on the host system's architecture, the remainder of the virtualized controller having an abstract architecture implementation that does not change when changing architecture.

2. The system as claimed in claim 1, wherein the physical connection comprises SPI, I2C or UART.

3. The system of claim 1, wherein the peripheral comprises a display device.

4. The system of claim 3, wherein the peripheral comprises an embedded display device.

5. The system of claim 3, wherein the peripheral comprises a touch-screen device.

6. The system of claim 5, wherein the virtualized controller is configured to provide touch-screen specific initialization and control routines that are portable from one system/architecture to another.

7. The system of claim 1, wherein the virtualized controller is configured to support multiple different peripherals and/or peripheral types.

8. The system of claim 1, wherein the virtualized controller is extensible to support new peripherals and/or peripheral types.

9. The system of claim 1, wherein the virtualized controller is encoded on an EEPROM that is at or accessible to the host system on boot-up of the host system.

10. A display system comprising:
    a host system;
    a hardware independent peripheral control system as claimed in claim 1; and,
    a display,
    the hardware independent peripheral control system, when executed by the host system, being configured to act as an intermediary layer between the host and the display and translate display agnostic instructions received in a display agnostic language from the host to instructions specific to the display.

11. The display system of claim 10, the hardware independent peripheral control system further comprising a data repository of display specific instructions for different displays or display types, wherein upon switching the display to a new display in the display system the hardware independent peripheral control system being configured to switch to instructions specific to the new display transparently to the host system.

12. The display system of claim 10, wherein the display is a touch-screen display system and/or a haptic system, the virtualized controller providing a control environment for both the display system and the touch-screen or haptic system.

13. The display system of claim 12, wherein the virtualized controller is configured to present the display and touch-screen or haptic system to the host system as a single addressable unit.

14. A computer implemented hardware independent peripheral control method comprising:
    executing, by a processor of a host system, a virtualized controller, the virtualized controller, when executed by the host system, providing an input interface, an output interface, a processor and a non-transitory memory, the non-transitory memory encoding data on one or more peripheral specific instructions to control a peripheral attached to the host system, wherein the virtualized controller comprises a plurality of layers including an input/output wrapper layer, wherein only the input/output wrapper layer is dependent on the host system's architecture, the remainder of the virtualized controller having an abstract architecture implementation that does not change when changing architecture, the method further comprising:
    receiving, at the input interface, peripheral agnostic instructions from the host system;
    upon receiving the peripheral agnostic instructions at the input interface, generating by the processor of the virtualized controller, corresponding peripheral specific instructions in dependence on the data in the non-transitory memory; and,
    outputting the corresponding peripheral specific instructions via the output interface to the peripheral via a physical connection between the host system and the peripheral.

15. A method for hardware independent peripheral control comprising:

executing a virtualised controller by a processor of a host computer system, the virtualised controller, when executed by the host system, having an input interface, an output interface, a processor and a non-transitory memory, the non-transitory memory encoding data on one or more peripheral specific instructions to control a peripheral attached to the host system, wherein the virtualized controller comprises a plurality of layers including an input/output wrapper layer, wherein only the input/output wrapper layer is dependent on the host system's architecture, the remainder of the virtualized controller having an abstract architecture implementation that does not change when changing architecture;

receiving, at the input interface, peripheral agnostic instructions from the host system, upon receiving the peripheral agnostic instructions at the input interface, generating, by the processor of the virtualised controller, corresponding peripheral specific instructions in dependence on the data in the non-transitory memory; and, outputting the corresponding peripheral specific instructions via the output interface to the peripheral via a physical connection between the host system and a peripheral.

* * * * *